Patented July 21, 1925.

1,546,713

UNITED STATES PATENT OFFICE.

GIUSEPPE BRUNI, OF MILAN, ITALY.

VULCANIZED RUBBER PRODUCT AND METHOD OF OBTAINING THE SAME.

No Drawing.   Application filed February 23, 1924.   Serial No. 694,773.

*To all whom it may concern:*

Be it known that I, GIUSEPPE BRUNI, subject of the King of Italy, residing at Milan, Italy, have invented certain new and useful Improvements in Vulcanized Rubber Products and Methods of Obtaining the Same, of which the following is a specification.

My invention relates to the art of vulcanizing rubber or rubber mixtures and to the products resulting therefrom and will be fully understood from the following specification.

It is already known that derivatives of benzothiazole act as accelerators of vulcanization. The substances hitherto applied to that purpose, or known to have this accelerating power, are mercaptobenzothiazoles, of which the mercaptobenzothiazole

is the simplest representative, their salts or their disulphides like

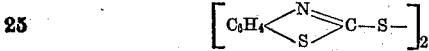

The literature of this argument is fully exposed in the book entitled "Systematic Survey of the Rubber Chemistry" by C. W. Bedford and H. W. Winkelmann, published by The Chemical Catalog Co. New York, 1923. See for instance pages 31, 38, 46, 49, 96, 104, 184, 191, 316.

The above named substances, namely mercaptobenzothiazoles, their salts and disulphides, have not found, and probably will not find, an extensive use in industrial practice, chiefly because they are too powerful, being capable of promoting vulcanization even at low or moderate temperatures, such as frequently occur during the preliminary treatment of the rubber mixtures, like milling, calendering, tubing, etc., so that the aforesaid accelerators may easily spoil the mixtures in which they are contained, causing premature vulcanization, or as it is commonly called, scorching.

I have now found that other and different derivatives of the benzothiazole group are accelerators sufficiently powerful for practical purposes, but have not the harmful effect of scorching the mixtures, because their accelerating power makes itself sensible only at temperatures above those which are commonly reached in the preliminary mechanical treatment of rubber mixtures.

These derivatives do not contain the mercaptan-group, nor the disulphide-group which are the bearers of the tremendous accelerating and scorching power above stated, but instead of these they contain the radicle of an arylamine.

The prototype of this class of accelerators is the 1.anilinobenzothiazole

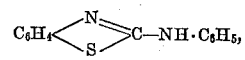

but its homologues containing lateral chains or groups in the benzene-nucleus of the benzothiazole part of the molecule, or in the benzene nucleus of the aniline part, or in both, may also be used with good results.

These substances may be produced easily by the action of oxidizing agents like bromine or chlorine upon the substituted thioureas. For instance, anilino-benzothiazole is obtained by the action of bromine upon thiocarbanilide:

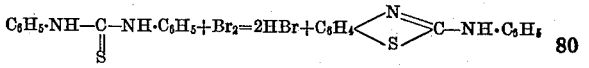

Example: A mixture of rubber 100 parts, sulphur 8 parts, zinc oxide 10 parts, and anilinobenzothiazole 1 part is vulcanized by heating it for 45 minutes at 144° C.

Having thus described the nature of my invention, what I now claim is:

1. A process for vulcanizing rubber consisting in the use of 1.anilinobenzothiazole as an accelerator.

2. A process for vulcanizing rubber consisting in the use of an 1.arylaminobenzothiazole as an accelerator.

3. A process for vulcanizing rubber consisting in the use of an homologue of anilinobenzothiazole of the general formula:

(where R is a monovalent radicle) as an accelerator.

4. A process for vulcanizing rubber consisting in the use of an homologue of anilinobenzothiazole of the general formula:

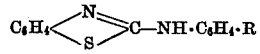

(where R is a monovalent radicle) as an accelerator.

5. A process for vulcanizing rubber consisting in the use of an homologue of anilinobenzothiazole of the general formula:

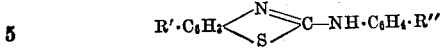

(where R' and R" are monovalent radicles) as an acceuerator.

6. A process for vulcanizing rubber consisting in the use of an homologue of anilinobenzothiazole of the general formula:

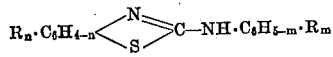

(where in the place of R are to be considered monovalent radicles) as an accelerator.

7. A process for vulcanizing rubber consisting in the use of a substituted 1.anilinobenzothiazole as an accelerator.

8. A process for vulcanizing rubber consisting in the use of the product of reaction of bromine upon an aromatic substituted thiourea as an accelerator.

9. A process for vulcanizing rubber consisting in the use of the product of reaction of chlorine upon an aromatic substituted thiourea as an accelerator.

10. A vulcanized rubber product, produced by the reaction of rubber, a vulcanizing agent, and 1.anilinobenzothiazole as an accelerator.

11. A vulcanized rubber product, produced by the reaction of rubber, a vulcanizing agent, and an 1.arylaminobenzothiazole as an accelerator.

12. A vulcanized rubber product, produced by the reaction of rubber, a vulcanizing agent, and an homologue of anilinobenzothiazole of the general formula:

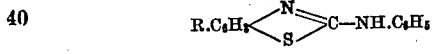

(where R is a monovalent radicle) as an accelerator.

13. A vulcanized rubber product, produced by the reaction of rubber, a vulcanizing agent, and a substituted 1.anilinobenzothiazole of the general formula:

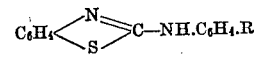

(where R is a monovalent radicle) as an accelerator.

14. A vulcanized rubber product, produced by the reaction of rubber, a vulcanizing agent, and an homologue of anilinobenzothiazole of the general formula:

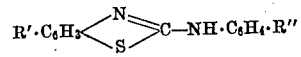

(where R' and R" are monovalent radicles) as an accelerator.

15. A vulcanized rubber product, produced by the reaction of rubber, a vulcanizing agent, and an homologue of anilinobenzothiazole of the general formula:

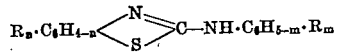

(where in the place of R are to be considered monovalent radicles) as an accelerator.

16. A vulcanized rubber product, produced by the reaction of rubber, a vulcanizing agent, and a substituted 1.anilinobenzothiazole as an accelerator.

17. A vulcanized rubber product, produced by the reaction of rubber, a vulcanizing agent, and the reaction product of bromine upon an aromatic substituted thiourea as an accelerator.

18. A vulcanized rubber product, produced by the reaction of rubber, a vulcanizing agent, and the reaction product of chlorine upon an aromatic substituted thiourea as an accelerator.

In testimony whereof I affix my signature.

GIUSEPPE BRUNI.